(12) United States Patent
Kamiyama et al.

(10) Patent No.: US 10,518,608 B2
(45) Date of Patent: Dec. 31, 2019

(54) VEHICLE AIR-CONDITIONER SAFETY DEVICE, AND CONTROL METHOD THEREOF

(71) Applicant: CALSONIC KANSEI CORPORATION, Saitama-shi, Saitama (JP)

(72) Inventors: Naohisa Kamiyama, Saitama (JP); Takeshi Satou, Saitama (JP); Takeshi Ogasawara, Saitama (JP); Hiroki Yoshioka, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 0 days.

(21) Appl. No.: 15/102,758

(22) PCT Filed: Nov. 4, 2014

(86) PCT No.: PCT/JP2014/079266
§ 371 (c)(1),
(2) Date: Jun. 8, 2016

(87) PCT Pub. No.: WO2015/087641
PCT Pub. Date: Jun. 18, 2015

(65) Prior Publication Data
US 2016/0318375 A1 Nov. 3, 2016

(30) Foreign Application Priority Data
Dec. 9, 2013 (JP) .................................. 2013-254265

(51) Int. Cl.
*B60H 1/22* (2006.01)
*B60H 1/00* (2006.01)
(Continued)

(52) U.S. Cl.
CPC ....... *B60H 1/2218* (2013.01); *B60H 1/00807* (2013.01); *B60H 1/00885* (2013.01);
(Continued)

(58) Field of Classification Search
CPC ........ B60H 1/00807; B60H 2001/2231; B60H 2001/2256; B60H 2001/2262;
(Continued)

(56) References Cited

U.S. PATENT DOCUMENTS 4,091,266 A * 5/1978 Ito .......................... G05D 23/24
219/490
4,866,559 A * 9/1989 Cobb, III ................ H02H 3/085
307/117

(Continued)

FOREIGN PATENT DOCUMENTS

CN 103373231 A 10/2013
DE 19524260 A1 * 1/1997 ........... B60H 1/2206
(Continued)

OTHER PUBLICATIONS

JP2013203254 English Machine Translation—Retrieved Aug. 2017.*
(Continued)

*Primary Examiner* — Cassey D Bauer
*Assistant Examiner* — Jenna M Hopkins
(74) *Attorney, Agent, or Firm* — Foley & Lardner LLP

(57) ABSTRACT

A vehicle air-conditioner safety device includes a controller which, in a case in which an abnormality has occurred in a heating device that heats coolant with a heater, determines whether or not the abnormality is a restorable abnormality or a non-restorable abnormality. When the abnormality is determined to be the restorable abnormality, it is determined whether or not the restorable abnormality has been removed. Heating by the heater is prohibited when the restorable abnormality or the non-restorable abnormality has occurred.

(Continued)

Heating by the heater is restored when the restorable abnormality has been removed after heating by the heater is prohibited due to occurrence of the restorable abnormality.

5 Claims, 4 Drawing Sheets

(51) Int. Cl.
- F24H 9/20 (2006.01)
- H05B 1/02 (2006.01)
- F28F 27/00 (2006.01)

(52) U.S. Cl.
CPC ......... *B60H 1/2221* (2013.01); *F24H 9/2028* (2013.01); *F28F 27/00* (2013.01); *H05B 1/0236* (2013.01); *B60H 2001/224* (2013.01); *B60H 2001/2231* (2013.01); *B60H 2001/2256* (2013.01); *B60H 2001/2262* (2013.01); *F24H 2250/04* (2013.01); *F28F 2265/00* (2013.01)

(58) Field of Classification Search
CPC ......... B60H 2001/00218; B60H 1/2218; F24F 2011/0046; H05B 1/0236
USPC ...................................... 165/11.1; 122/504.2
See application file for complete search history.

(56) References Cited

U.S. PATENT DOCUMENTS

| | | | | |
|---|---|---|---|---|
| 4,926,025 A * | 5/1990 | Wilhelm | ............... | B60H 1/2218 219/202 |
| 5,991,509 A * | 11/1999 | Goto | .................... | B60H 1/2221 392/441 |
| 6,059,197 A * | 5/2000 | Kurahashi | .......... | B60H 1/00735 123/142.5 E |
| 6,094,975 A * | 8/2000 | Hasegawa | ........... | F02D 41/1494 123/688 |
| 6,262,400 B1 * | 7/2001 | Urbank | ................ | B60H 1/2218 219/202 |
| 6,998,584 B1 * | 2/2006 | Luo | ....................... | H05B 1/0236 219/483 |
| 9,328,940 B2 | 5/2016 | Satoh et al. | | |
| 9,851,388 B2 * | 12/2017 | Kim | ....................... | G01R 31/02 |
| 2003/0006228 A1 * | 1/2003 | Nagatomo | ............. | B62D 1/065 219/494 |
| 2003/0048097 A1 * | 3/2003 | Ishihara | .................. | G05F 1/567 323/285 |
| 2003/0072117 A1 * | 4/2003 | Maekawa | ............... | H02M 1/08 361/86 |
| 2003/0106883 A1 * | 6/2003 | Sangwan | ................. | H05B 3/84 219/203 |
| 2007/0287201 A1 * | 12/2007 | Ishizu | .............. | H01L 21/67248 438/10 |
| 2008/0002326 A1 * | 1/2008 | Watanabe | ............ | B60H 1/2218 361/103 |
| 2011/0157752 A1 * | 6/2011 | Sakanobe | ............. | H02H 3/006 361/18 |
| 2012/0109547 A1 * | 5/2012 | Willey | ................. | H05B 1/0236 702/58 |
| 2013/0134800 A1 * | 5/2013 | Kim | ....................... | H02H 5/042 307/117 |
| 2013/0213600 A1 * | 8/2013 | Saitoh | ..................... | F01P 7/165 165/11.1 |
| 2013/0286526 A1 * | 10/2013 | Satoh | ..................... | H02H 5/047 361/105 |
| 2013/0292372 A1 * | 11/2013 | Puzenat | ............... | B60H 1/2218 219/490 |
| 2013/0319991 A1 | 12/2013 | Nishikawa et al. | | |
| 2013/0327842 A1 * | 12/2013 | Seiler | ................... | H05B 1/0236 237/12.4 |
| 2013/0334193 A1 * | 12/2013 | Nagami | ............... | H05B 1/0202 219/202 |
| 2015/0014293 A1 * | 1/2015 | Bytzek | ................. | H05B 1/0236 219/202 |
| 2015/0034626 A1 * | 2/2015 | Kominami | ........... | H05B 1/0236 219/483 |
| 2015/0122899 A1 * | 5/2015 | Kaneko | ................ | H05B 1/0236 236/94 |
| 2015/0129576 A1 * | 5/2015 | Maemura | ............. | H05B 1/0236 219/494 |
| 2015/0323603 A1 * | 11/2015 | Kim | .................... | H01M 10/625 702/58 |
| 2016/0025059 A1 * | 1/2016 | Godsall | ................... | F23N 5/022 237/5 |

FOREIGN PATENT DOCUMENTS

| | | | | |
|---|---|---|---|---|
| DE | 10 2012 200 570 A1 | | 7/2013 | |
| DE | 102012200570 A1 * | | 7/2013 | ........... B60H 1/2218 |
| EP | 2189733 A1 * | | 5/2010 | ........... F24H 9/2071 |
| JP | 05073157 A * | | 3/1993 | |
| JP | 10157446 A * | | 6/1998 | |
| JP | 10-287123 A | | 10/1998 | |
| JP | 10-299561 A | | 11/1998 | |
| JP | 2007-218447 A | | 8/2007 | |
| JP | 2012056562 A * | | 3/2012 | ........... B60H 1/2218 |
| JP | 2013-203254 A | | 10/2013 | |
| JP | 2013-220708 A | | 10/2013 | |
| JP | 2013203254 A * | | 10/2013 | |
| JP | 2013-230021 A | | 11/2013 | |
| JP | 2013235759 A * | | 11/2013 | ........... H05B 1/0236 |
| JP | 2014012510 A * | | 1/2014 | ........... H05B 1/0202 |
| JP | 2015173019 A * | | 10/2015 | ........... H05B 1/0227 |
| JP | 2016222098 A * | | 12/2016 | ............... B60H 1/20 |
| KR | 1020090039143 A * | | 7/2009 | |
| WO | WO-2012/147308 A1 | | 11/2012 | |
| WO | WO 2013157357 A1 * | | 10/2013 | ........... H05B 1/0236 |
| WO | WO 2012/147308 A1 | | 7/2014 | |
| WO | WO-2015137006 A1 * | | 9/2015 | ........... H05B 1/0227 |

OTHER PUBLICATIONS

JPH0573157A English Machine Translation—Retrieved Aug. 2017.*
JP10157446A English Machine Translation—Retrieved Feb. 2018.*
KR 10-2009-0039143 A1—English Machine Translation (Retreived Sep. 2018).*

* cited by examiner

VEHICLE AIR-CONDITIONER SAFETY DEVICE, AND CONTROL METHOD THEREOF

TECHNICAL FIELD

The present invention relates to a vehicle air-conditioner safety device and a control method thereof.

BACKGROUND ART

JP2007-218447A discloses a conventional device in which, when an abnormality has occurred, an operation is halted in accordance with a detail of the abnormality, a power disconnecting command is sent to power switching means, the power switching means is opened to turn off the power, and thereafter, the power is supplied from a battery to close the power switching means, whereby the power is turned on again and the power is reset.

SUMMARY OF INVENTION

However, with the above-mentioned technique, because the power is reset when the power is turned on, regardless of whether the abnormality has been removed, there is a problem in that, in the case in which the abnormality has not been removed, the abnormality occurs again after the power is turned on, and the operation is halted as soon as the power is turned on.

The present invention has been invented to solve the problem described above, and an object thereof is to provide a device in which, even when an abnormality has occurred and the abnormality has not been removed, repetitive restoration and halt of operation is prevented.

According to one aspect of the present invention, A vehicle air-conditioner safety device includes: abnormality determination means for determining, when an abnormality has occurred in a heating device that heats coolant with a heater, whether the abnormality is a restorable abnormality or a non-restorable abnormality; removal determination means for determining, when the abnormality is determined as being the restorable abnormality, whether or not the restorable abnormality is removed; heating prohibition means for prohibiting heating by the heater when the restorable abnormality or the non-restorable abnormality has occurred; and heating restoration means for restoring heating by the heater when the restorable abnormality is removed after heating by the heater is prohibited due to occurrence of the restorable abnormality.

According to another aspect of the present invention, a control method of a vehicle air-conditioner safety device includes: when an abnormality has occurred in a heating device that heats coolant with a heater, determining whether the abnormality is a restorable abnormality or a non-restorable abnormality; when the abnormality is determined as the restorable abnormality, determining whether or not the restorable abnormality has been removed; prohibiting heating by the heater when the restorable abnormality or the non-restorable abnormality has occurred; and restoring heating by the heater when the restorable abnormality has been removed after heating by the heater has been prohibited due to occurrence of the restorable abnormality.

According to these aspects, in the case in which a restorable abnormality has occurred in a heating device for a vehicle air-conditioner and the restorable abnormality has not been removed, because heating by the heater is prohibited, it is possible to prevent repetitive restoration and halt of heating by the heater.

DESCRIPTION OF EMBODIMENT

An embodiment of the present invention will be described below with reference to the drawings.

Figure 1:
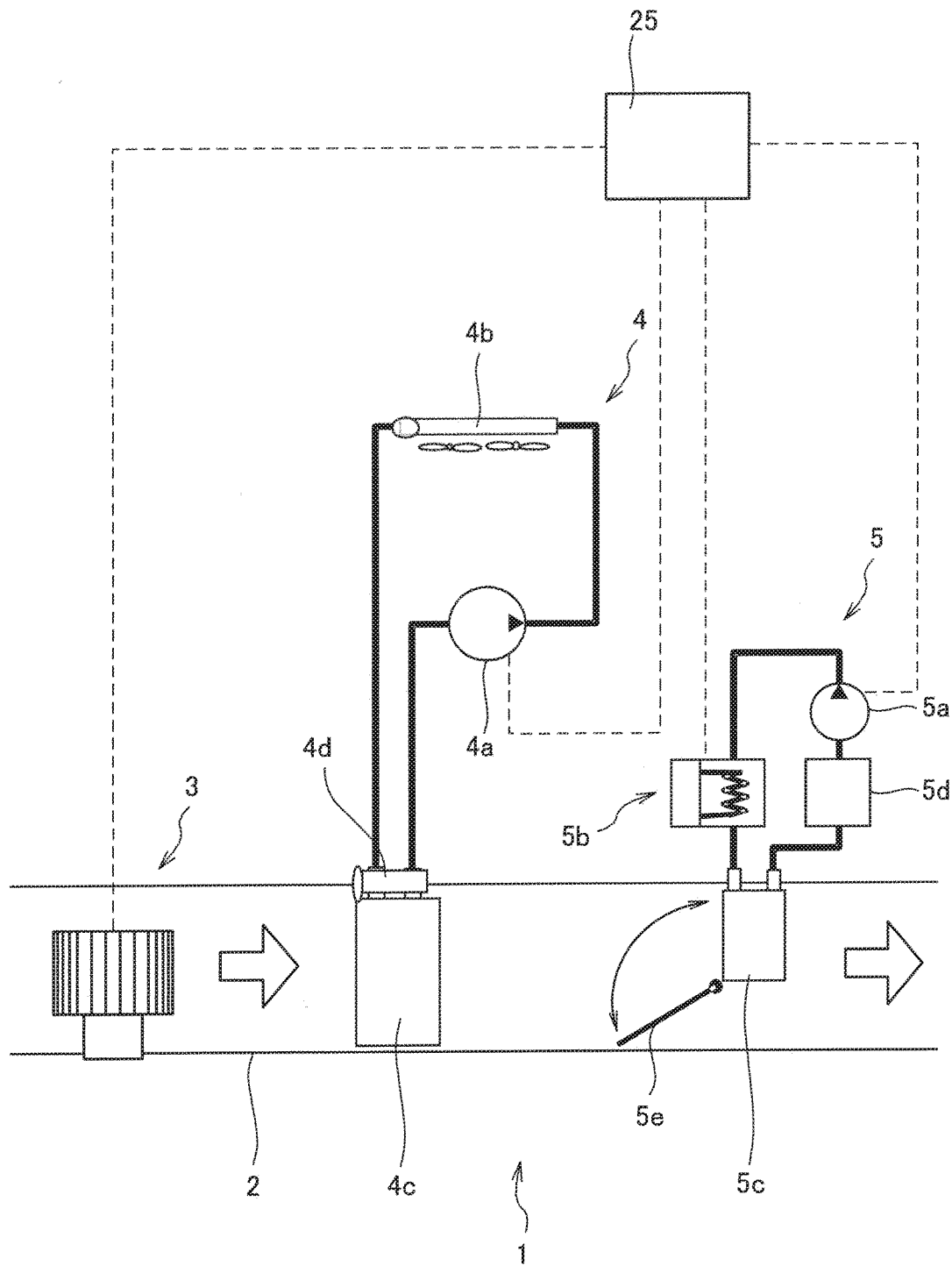
FIG. 1 is a configuration diagram showing, in outline, a vehicle air-conditioner according to the present embodiment.

FIG. 1 is a configuration diagram showing, in outline, a vehicle air-conditioner 1 of according to the present embodiment. Although a description is given of the vehicle air-conditioner 1 mounted on hybrid vehicles or electric vehicles, it is not limited thereto.

The vehicle air-conditioner 1 includes a cooler unit 4 that cools (dehumidifies) air, which is caused to flow through an air duct 2 by a blower 3, a heater unit 5 that warms the air, and a controller 25.

The cooler unit 4 includes a compressor 4a that compresses and circulates coolant, a condenser 4b that cools the compressed coolant, an evaporator 4c that evaporates the compressed and cooled coolant, and an expansion valve 4d that injects the coolant to the evaporator 4c. The cooler unit 4 cools (dehumidifies) the air flowing through the air duct 2 as the coolant is evaporated at the evaporator 4c.

The heater unit 5 includes a water pump 5a that circulates cooling water (coolant), a heating part 5b that warms the cooling water, a heater core 5c that warms the air flowing through the air duct 2 with the warmed cooling water, and an air vent tank 5d that removes the air from the cooling water. The amount of the air flowing through the heater core 5c can be adjusted by a mix door 5e.

Figure 2:
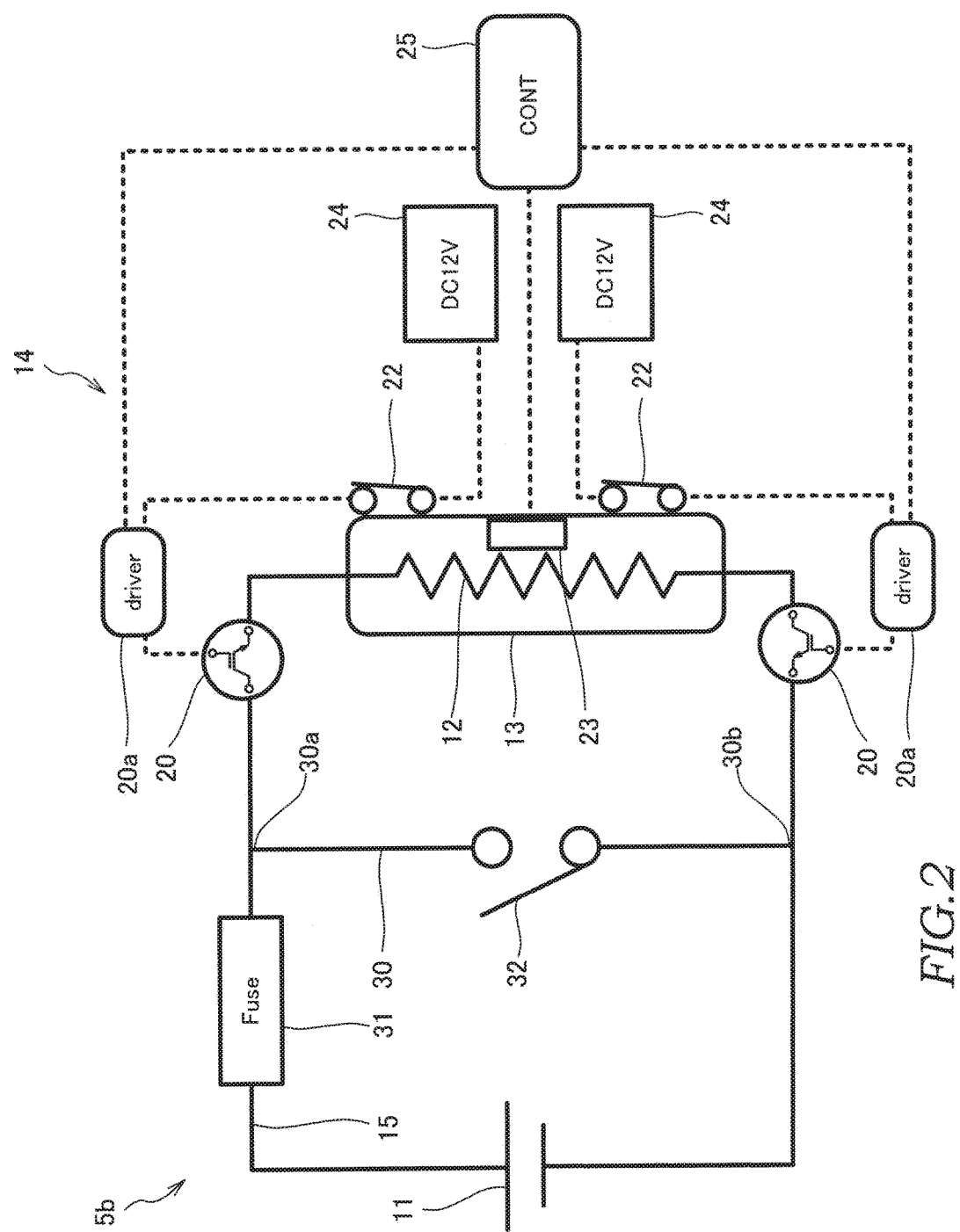
FIG. 2 is a circuit diagram of a heating part.

Next, the heating part 5b will be described using FIG. 2. FIG. 2 is a circuit diagram of the heating part 5b. The heating part 5b includes a DC power source 11, an electric heater 12 that is operated by current supplied from the DC power source 11, a tank 13 for accommodating the electric heater 12, and a safety device 14 that supplies and interrupts the current to the electric heater 12.

The DC power source 11 is a high voltage battery that is mounted on hybrid vehicles, electric vehicles, or the like. The output voltage of the DC power source 11 is high voltage of 30V or greater, and in this case, the output voltage is 350V. The current from the DC power source 11 is supplied to the electric heater 12 via a supply line 15. AC power source may be used as the power source instead of the DC power source 11. The DC power source 11 also supplies the current to the compressor 4a etc.

Examples of the electric heater 12 can include a sheathed heater, a PTC (Positive Temperature Coefficient) heater, and so forth that generate heat by the applied current.

The safety device 14 includes IGBTs (Insulated Gate Bipolar Transistor) 20 as transistors provided on the supply line 15, bimetal switches 22 that switch control current for controlling the IGBTs 20, and power units 24 that supply the control current (DC12V) to the IGBTs 20.

In addition, the safety device 14 includes a short-circuit line 30 that is capable of short-circuiting the electric heater 12 at upstream and downstream thereof on the supply line 15, a power fuse 31 that is provided on the supply line 15 between the DC power source 11 and the short-circuit line 30, and a bimetal switch 32 that is provided on the short-circuit line 30.

When the control current is interrupted, the IGBTs 20 interrupt the current supplied to the electric heater 12, and when the control current is applied, the IGBTs 20 allow the current to be supplied to the electric heater 12. The IGBTs 20 are provided on the supply line 15 at positions close to the electric heater 12 relative to short-circuit positions of the short-circuit line 30. When the circuit is short-circuited by the short-circuit line 30, the current from the DC power source 11 does not flow to the IGBTs 20. As a result, the IGBTs 20 are protected from large current generated when the circuit is short-circuited by the short-circuit line 30.

A pair of IGBTs 20 are provided at the upstream side and the downstream side of the electric heater 12. Specifically, one of the IGBTs 20 is provided at the position downstream of a contact between a first end 30a of the short-circuit line 30 and the supply line 15 and upstream of the electric heater 12 in the flow direction of the current, and the other of the IGBTs 20 is provided at the position downstream of the electric heater 12 and upstream of a contact between a second end 30b of the short-circuit line 30 and the supply line 15 in the flow direction of the current.

When the control current is applied, the IGBTs 20 allow flow of the current through the supply line 15. However, in the case in which the controller 25 gives a command to drivers 20a such that the control current from the power units 24 is to be interrupted on the basis of electric signals from a water temperature sensor 23 etc., or in the case in which the control current is interrupted by the bimetal switches 22, the IGBTs 20 halt their function so as to interrupt the current flow through the supply line 15.

Figure 3:
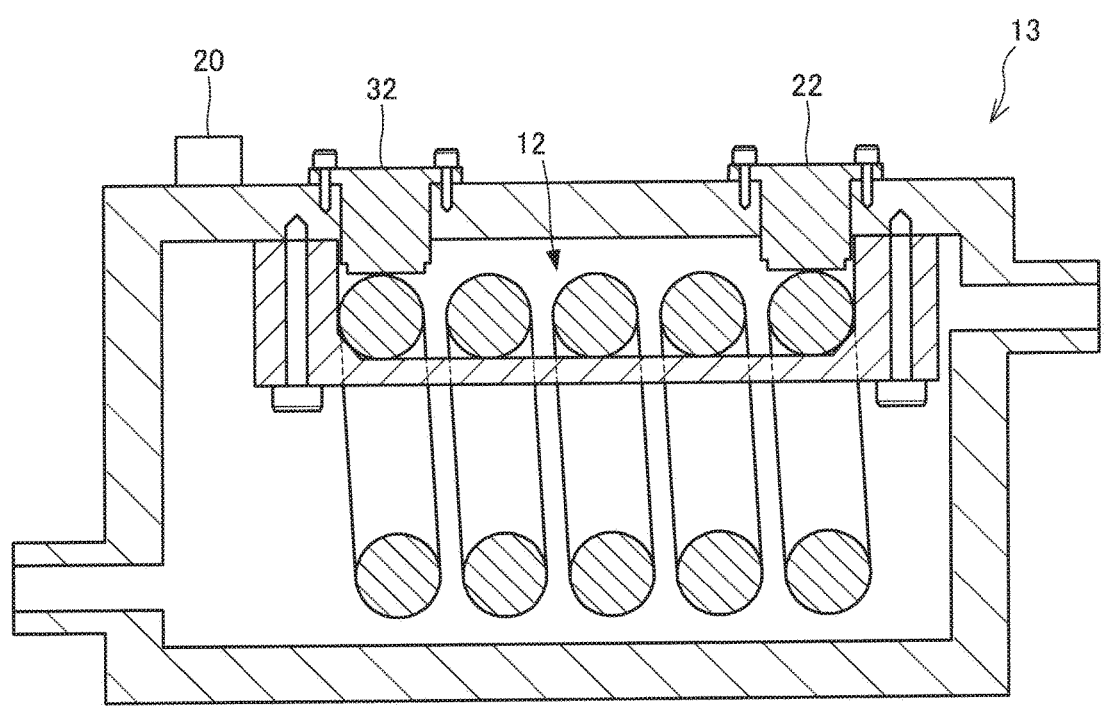
FIG. 3 is a sectional diagram showing a part of the heating part.

As shown in FIG. 3, for example, the IGBTs 20 are arranged so as to be in contact with the tank 13 and cooled with the cooling water circulated by the water pump 5a. FIG. 3 is a sectional diagram showing, in outline, the electric heater 12 and the tank 13. The positions of the IGBTs 20 are not limited to those shown in FIG. 3, and they may be arranged so as to be coolable with the cooling water.

The bimetal switches 22 are of normally closed types that are switched to an energized state in a normal condition. The bimetal switches 22 are lower-voltage-side bimetal switches that pass smaller current than the bimetal switch 32 when switched to the energized state. As shown in FIG. 3, the bimetal switches 22 are in contact with the electric heater 12 so as to allow transfer of heat. The bimetal switches 22 interrupt the control current when the temperature of the electric heater 12 reaches a first preset temperature and allow flow of the control current when the temperature of the electric heater 12 is lowered to a second preset temperature that is lower than the first preset temperature. A pair of bimetal switches 22 are provided so as to be interposed between the power units 24 and the IGBTs 20, respectively.

The first preset temperature is set to a temperature that is higher than an upper-limit water temperature Tw_lim in an allowable temperature range of the cooling water in the tank 13. By doing so, the bimetal switches 22 are kept in the energized state when the IGBTs 20 are controlled normally by the controller 25. On the other hand, the second preset temperature is set to the temperature that is achieved when the control current is interrupted by the bimetal switches 22 and the temperature of the cooling water in the tank 13 is sufficiently lowered.

As shown in FIG. 2, in the flow direction of the current through the supply line 15, the short-circuit line 30 is connected at the first end 30a located downstream of the power fuse 31 and upstream of the electric heater 12, and the short-circuit line 30 is connected at the second end 30b located downstream of the electric heater 12 and upstream of the DC power source 11. The short-circuit line 30 is a conductor with very small resistance connecting the first end 30a and the second end 30b that are connected to the supply line 15. In other words, when the circuit is short-circuited by the short-circuit line 30 at the upstream side and the downstream side of the electric heater 12, the resistance of the short-circuit line 30 is smaller than that of the electric heater 12.

The bimetal switch 32 is of a normally open type that is switched to an open state in a normal condition. The bimetal switch 32 is a high-voltage-side bimetal switch that passes larger current than the bimetal switches 22 when switched to the energized state. As shown in FIG. 3, the bimetal switch 32 is in contact with the electric heater 12 so as to allow transfer of heat.

The bimetal switch 32 is switched to the energized state when the temperature of the electric heater 12 reaches a third preset temperature that is higher than the first preset temperature. In a condition in which the temperature of the electric heater 12 is lower than the third preset temperature, the circuit is not short-circuited by the short-circuit line 30. The short-circuit state is achieved by the short-circuit line 30 when the temperature of the electric heater 12 reaches the third preset temperature and the bimetal switch 32 is switched to the energized state.

The third preset temperature is the critical temperature of the bimetal forming the bimetal switch 32. The third preset temperature is set to the temperature that is higher than the highest temperature of the electric heater 12 that is caused by an increase in the temperature due to overshoot that occurs after the interrupted state of the supply line 15 is established when the temperature of the electric heater 12 reaches the first preset temperature and the control current to the IGBTs 20 is interrupted by the bimetal switches 22. Therefore, when the bimetal switches 22 and the IGBTs 20 are functioning normally, the temperature of the electric heater 12 does not reach the third preset temperature.

The power fuse 31 breaks the circuit by the instant large current (overcurrent) that flows when the circuit is short-circuited by the short-circuit line 30. Because the resistance of the short-circuit line 30 is very small, as the circuit is short-circuited by the short-circuit line 30, the large current (overcurrent) that is larger than the current flowing through the electric heater 12 before the circuit is short-circuited by the short-circuit line 30 flows through the power fuse 31. The power fuse 31 breaks the circuit by the current supplied by the DC power source 11 before the temperature of a harness (not shown) for supplying the current exceeds the allowable temperature due to heat generation. This allowable temperature is set to a temperature range causing no damage to parts forming the harness.

The controller 25 controls the water pump 5a, the drivers 20a etc. on the basis of signals from the water temperature sensor 23 etc., thereby controlling the cooler unit 4 and the heater unit 5.

Figure 4:
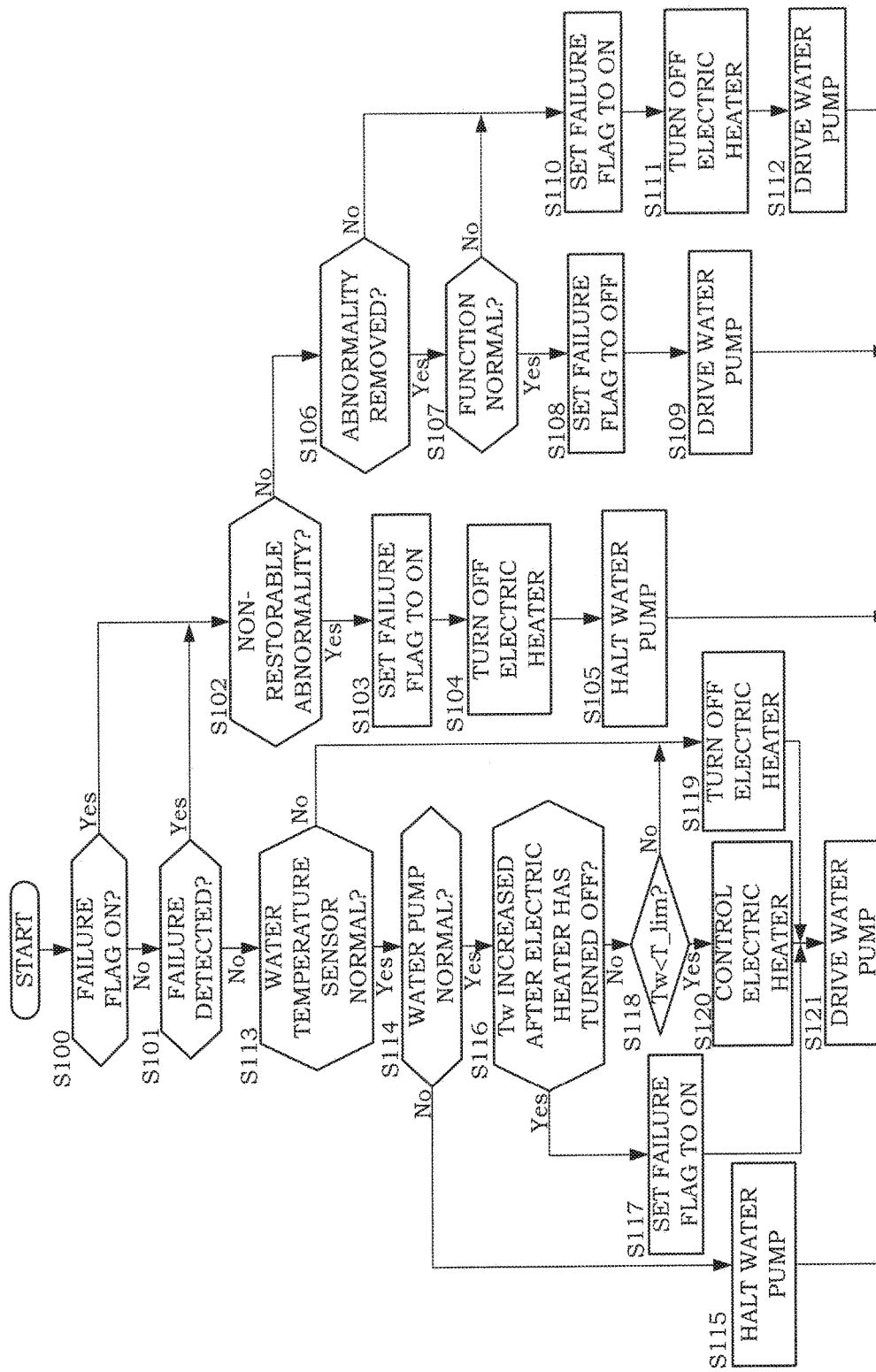
FIG. 4 is a flowchart for explaining a control method of a heater unit.

Next, a control method of the heater unit 5 will be described using a flowchart in FIG. 4.

In Step S100, the controller 25 determines whether or not a failure flag is ON. When the failure flag is ON, the process proceeds to Step S102, and when the failure flag is OFF, the process proceeds to Step S101.

In Step S101, the controller 25 determines whether or not a new failure is detected. When a new failure is detected, the process proceeds to Step S102, and when a new failure is not detected, the process proceeds to Step S113.

In Step S102, the controller 25 determines whether or not the failure is a non-restorable abnormality. The non-restorable abnormality is an abnormality related to driving of the IGBTs 20, such as, for example, an IGBT functional abnormality in which an input signal and a driving signal of the IGBTs 20 do not match, a driver abnormality in which malfunction of the drivers 20a driving the IGBTs 20 occurs, and so forth. If the failure is the non-restorable abnormality, the process proceeds to Step S103, and if the failure is not the non-restorable abnormality and is a restorable abnormality, the process proceeds to Step S106. The restorable abnormality includes an abnormal voltage of the DC power source 11, an IGBT temperature abnormality in which the temperatures of the IGBTs 20 become higher than the preset temperature, a heater temperature abnormality in which the temperature of the electric heater 12 becomes higher than the preset temperature, and so forth. The heater temperature abnormality occurs when, for example, the cooling water is leaked or the bimetal switches 22 are activated.

In Step S103, the controller 25 sets the failure flag to ON.

In Step S104, the controller 25 turns off the electric heater 12 and prohibits the electric heater 12 from being turned on, thereby prohibiting the cooling water from being heated by the electric heater 12. When the non-restorable abnormality has occurred, the electric heater 12 is prohibited from being turned on until the part causing the non-restorable abnormality is repaired.

In Step S105, the controller 25 halts the water pump 5a.

In Step S106, the controller 25 determines whether or not the restorable abnormality is removed. Specifically, the controller 25 determines whether or not the restorable abnormality, which has caused the failure flag to be ON, is removed. When the restorable abnormality is removed, the process proceeds to Step S107, and when the restorable abnormality is not removed, the process proceeds to Step S110.

In Step S107, the controller 25 determines whether or not the heater unit 5 functions normally. Although the controller 25 determines whether or not the restorable abnormality, which has caused the failure flag to be ON, is removed in Step S106, the controller 25 determines in this step whether or not another restorable abnormality has occurred. When another restorable abnormality has not occurred and the heater unit 5 functions normally, the process proceeds to Step S108, and when the heater unit 5 functions abnormally, the process proceeds to Step 110.

In Step S108, the controller 25 sets the failure flag to OFF.

In Step S109, the controller 25 continues driving of the water pump 5a.

In Step S110, the controller 25 sets the failure flag to ON.

In Step S111, the controller 25 turns off the electric heater 12 and prohibits the electric heater 12 from being turned on, thereby prohibiting the cooling water from being heated by the electric heater 12. In this step, although the electric heater 12 cannot be turned on when the failure flag is ON, different from Step S104, it is possible to turn on the electric heater 12 when the failure flag is set to OFF.

In Step S112, the controller 25 continues driving of the water pump 5a. In the case in which the restorable abnormality has occurred, for example, the temperatures of the IGBTs 20 may be high, and in such a case, the IGBTs 20 etc. may need to be cooled. Therefore, when the restorable abnormality has occurred and the heater unit 5 functions abnormally, driving of the water pump 5a is continued to cool, for example, the IGBTs 20 with the cooling water such that the restorable abnormality is removed.

In Step S113, the controller 25 determines whether or not the signal from the water temperature sensor 23 is normal. Specifically, the controller 25 determines whether or not a value obtained by A/D converting the temperature Tw of the cooling water detected by the water temperature sensor 23 does not shift from "open" or "close" state, and determines that it is abnormal if the A/D converted value does not shift from "open" or "close" state. When the signal from the water temperature sensor 23 is normal, the process proceeds to Step S114, and when the signal from the water temperature sensor 23 is abnormal, the process proceeds to Step S119.

In Step S114, the controller 25 determines whether or not the water pump 5a functions normally. Specifically, the controller 25 determines whether or not a driving signal is output from the water pump 5a, and determines that it is normal when the driving signal is output. When the water pump 5a is driven normally, the process proceeds to Step S116, and when the water pump 5a is driven abnormally, the process proceeds to Step S115.

In Step S115, the controller 25 halts driving of the water pump 5a.

In Step S116, the controller 25 determines, on the basis of the signal from the water temperature sensor 23, whether or not the temperature Tw of the cooling water has increased after the electric heater 12 has been turned off. When the temperature Tw of the cooling water has increased, the process proceeds to Step S117, and when the temperature Tw of the cooling water is not increased, the process proceeds to Step S118. Here, the process also proceeds to Step S118 when the electric heater 12 is turned ON.

In Step S117, the controller 25 sets the failure flag to ON. This failure is the non-restorable abnormality. In the case in which the temperature Tw of the cooling water is increased after the electric heater 12 has been turned off, there is a possibility that an abnormality has occurred in the electric heater 12, the drivers 20a, or the IGBTs 20. Thus, in the present embodiment, this failure is considered as the non-restorable abnormality, and the electric heater 12 is prohibited from being turned on.

In Step S118, the controller 25 determines whether or not the temperature Tw of the cooling water is lower than the upper-limit water temperature Tw_lim in the allowable temperature range. When the temperature Tw is lower than the upper-limit water temperature Tw_lim, the process proceeds to Step S120, and when the temperature Tw is equal to or higher than the upper-limit water temperature Tw_lim, the process proceeds to Step S119.

In Step S119, the controller 25 turns off the electric heater 12.

In Step S120, the controller 25 allows the cooling water to be warmed by the electric heater 12 such that temperature of the air that has been warmed by the heater core 5c becomes a predetermined temperature.

In Step S121, the controller 25 continues driving of the water pump 5a.

Effects of the embodiment of the present invention will be described.

After the restorable abnormality has occurred and the electric heater 12 has been turned off to prohibit the electric heater 12 from heating the cooling water, when the restorable abnormality is removed, heating by the electric heater 12 is restored. By allowing heating by the electric heater 12 after removal of the restorable abnormality is confirmed, it is possible to prevent an event in which, for example, every time an ignition switch is turned on, due to occurrence of the restorable abnormality, the electric heater 12 is turned off immediately after the electric heater 12 has been turned on. As described above, it is possible to prevent repetitive on/off of the electric heater 12 while the restorable abnormality has not been removed after the restorable abnormality has occurred. By doing so, it is possible to prevent a driver from having a feeling of uncomfortableness. In addition, although further occurrence of abnormality in the heater unit 5 can be considered when the electric heater 12 is turned on/off repeatedly, this can be prevented with the present embodiment.

The restorable abnormality includes an abnormality in which at least one of the temperatures of the IGBTs 20 or the temperature of the electric heater 12 becomes higher than the respective preset temperatures, and when the restorable abnormality has occurred, while driving of the water pump 5a is continued, heating by the electric heater 12 is prohibited. By doing so, the cooling water is circulated by the water pump 5a to cool the IGBTs 20 and the electric heater 12, thereby making it possible to remove the restorable abnormality at an early stage.

In the case in which the temperature Tw of the cooling water is increased after the electric heater 12 has been turned off, the electric heater 12 is prohibited from being turned on. By doing so, it is possible to prevent further increase in the temperature Tw of the cooling water and to prevent further occurrence of abnormality in the heater unit 5.

Determination of whether or not the non-restorable abnormality has occurred is first carried out, and when the non-restorable abnormality has not occurred, determination of whether or not the restorable abnormality has occurred is carried out. When the non-restorable abnormality has occurred, even when the restorable abnormality has occurred and has been removed, heating by the electric heater 12 is prohibited. By doing so, it is possible to prevent further occurrence of abnormality in the heater unit 5.

In the case in which an abnormality related to driving of the IGBTs 20 has occurred, it is determined that the non-restorable abnormality has occurred, and heating by the electric heater 12 is prohibited. By doing so, it is possible to prevent further occurrence of abnormality in the heater unit 5.

Even in the case in which the restorable abnormality, which has cause the failure flag to be ON, is removed, the electric heater 12 is turned on after it has been confirmed that the heater unit 5 functions normally. By doing so, it is possible to prevent the electric heater 12 from being turned off immediately after it has been turned on.

Embodiments of this invention were described above, but the above embodiments are merely examples of applications of this invention, and the technical scope of this invention is not limited to the specific constitutions of the above embodiments.

This application claims priority based on Japanese Patent Application No. 2013-254265 filed with the Japan Patent Office on Dec. 9, 2013, the entire contents of which are incorporated into this specification.

The invention claimed is:

1. A vehicle air-conditioner safety device for a vehicle air-conditioner having a heating device, comprising:
   a controller configured to
      determine when an abnormality has occurred in the heating device that heats coolant with a heater, whether the abnormality is a restorable abnormality or a non-restorable abnormality,
      determine when the abnormality is determined as being the restorable abnormality, whether or not the restorable abnormality is removed,
      prohibit heating by the heater when the restorable abnormality has occurred and prohibit heating by the heater when the non-restorable abnormality has occurred,
      restore heating by the heater when the restorable abnormality is removed after heating by the heater is prohibited due to occurrence of the restorable abnormality, and
      prohibit heating by the heater, when the non-restorable abnormality has occurred, even when the restorable abnormality has been removed,
   wherein
      the restorable abnormality includes an abnormality in which a temperature of at least one of a switching device, which allows or interrupts flow of current to the heater, or the heater becomes higher than a predetermined temperature, and
      the non-restorable abnormality is an abnormality in which an input signal and a driving signal of a transistor as the switching device do not match.

2. The vehicle air-conditioner safety device according to claim 1, wherein
   when the restorable abnormality occurs, the controller prohibits heating by the heater while allowing driving of a pump circulating the coolant.

3. The vehicle air-conditioner safety device according to claim 1, wherein
   the controller determines whether or not the non-restorable abnormality has occurred and, when the non-restorable abnormality has not occurred, determines whether or not the restorable abnormality has occurred.

4. The vehicle air-conditioner safety device according to claim 1, wherein
   the controller restores heating by the heater after it has been determined that the restorable abnormality has been removed and the heating device functions normally.

5. The vehicle air-conditioner safety device according to claim 1, wherein the transistor is an IGBT.

* * * * *